US006744774B2

(12) United States Patent
Sharma

(10) Patent No.: US 6,744,774 B2
(45) Date of Patent: Jun. 1, 2004

(54) DYNAMIC ROUTING OVER SECURE NETWORKS

(75) Inventor: Atul Sharma, Norwood, MA (US)

(73) Assignee: Nokia, Inc., Irving, TX (US)

( * ) Notice: Subject to any disclaimer, the term of this patent is extended or adjusted under 35 U.S.C. 154(b) by 0 days.

(21) Appl. No.: 10/180,081

(22) Filed: Jun. 27, 2002

(65) Prior Publication Data

US 2004/0001497 A1 Jan. 1, 2004

(51) Int. Cl.$^7$ .............................................. H04L 12/56
(52) U.S. Cl. ...................... 370/401; 709/242
(58) Field of Search ............................... 370/401, 402, 370/409, 465, 254, 255, 257; 709/242, 238

(56) References Cited

U.S. PATENT DOCUMENTS

| | | | | |
|---|---|---|---|---|
| 5,602,839 A | * | 2/1997 | Annapareddy et al. | 370/405 |
| 5,867,666 A | * | 2/1999 | Harvey | 709/239 |
| 5,923,854 A | * | 7/1999 | Bell et al. | 709/243 |
| 6,067,574 A | * | 5/2000 | Tzeng | 709/247 |
| 6,101,188 A | * | 8/2000 | Sekine et al. | 370/401 |
| 6,115,362 A | * | 9/2000 | Bosa et al. | 370/248 |
| 6,330,599 B1 | * | 12/2001 | Harvey | 709/223 |
| 6,510,159 B1 | * | 1/2003 | Noriyuki | 370/401 |
| 6,611,872 B1 | * | 8/2003 | McCanne | 709/238 |
| 6,615,273 B1 | * | 9/2003 | Pan | 709/242 |
| 6,625,658 B1 | * | 9/2003 | Oguchi et al. | 709/238 |

OTHER PUBLICATIONS

J. Touch et al., "Use of IPsec Transport Mode for Virtual Networks", Internet Draft: http://search.ietf.org/internet-drafts/draft-touch-ipsec-vpn-03.txt, Mar. 2002, Expires: Sep. 1, 2002.

IP Security Protocol (ipsec), IPsec mailing lists: ipsec@lists.tislabs.com (with copies of e-mails from the mail list) May 16, 2002.

J. Moy, "OSPF Version 2", Internet Official Protocol Standards, Network Working Group, Request for Comments: 2328, STD: 54, Obsoletes: 2178, Category: Standards Track, Apr. 1998, pp. 1–204.

G. Malkin, "RIP Version 2", Internet Official protocol Standards, Network Working Group, Request for Comments: 2453, Obsoletes: 1723, 1388, STD: 56, Category: Standards Track, Nov. 1998, pp. 1–37.

S. Kent et al., "Security Architecture for Internet Protocol", Internet Official Protocol Standards, Network Working Group, Request for Comments: 2401, Obsoletes: 1825, Category: Standards Track, Nov. 1998, pp. 1–62.

* cited by examiner

*Primary Examiner*—Min Jung
(74) *Attorney, Agent, or Firm*—Banner & Witcoff, Ltd.

(57) ABSTRACT

Systems and methods are provided for routing packets on a network based on interface information of a routing gateway or a neighboring gateway. One embodiment includes updating a routing table using interface information shared by a neighboring router. Another embodiment includes making routing decisions based on interface information from a neighboring router. A further embodiment includes making routing decisions based on priorities determined from interface information. Another embodiment includes the steps of updating a routing table on a first gateway, which includes the steps of receiving data disclosing interface information on a neighboring second gateway, and updating a routing table based on the interface information. The interface information for the neighboring second gateway includes identification of communication interfaces on the second gateway, an interface type for each of the interfaces, and a physical type interface on which each virtual type interface is overlaid.

39 Claims, 10 Drawing Sheets

1

DYNAMIC ROUTING OVER SECURE NETWORKS

FIELD OF THE INVENTION

This invention relates generally to telecommunications networks. More particularly, the invention concerns systems and methods for dynamically routing packets on a network.

BACKGROUND OF THE INVENTION

Dynamic Routing is used on the Internet backbone (core and edge) routers. With the coming of Virtual Private Networks and overlay secure networks using VPN, semantics of dynamic routing shall be affected. Current methods for dynamic routing will lead to various issues and difficulties as virtual private networks become more common. Issues related to running dynamic routing on virtual private networks need to be addressed.

IPsec is the Internet Engineering Task Force (IETF) standards protocol for providing security over the Internet at the network (IP) level. It provides authentication and encryption with the help of manual or automatic key exchange via IKE protocol. IPsec can be implemented via transport or tunnel mode. For the application of virtual private networks and secure overlay networks, tunnel mode of IPsec is typically used. Many implementations implement IPsec tunnels as logical virtual interfaces overlaying the physical interfaces. These logical virtual interfaces can be used as with other interfaces to run dynamic protocols on top of them. In such a setup, the tunnel endpoints will be considered as neighbors and the tunnel will be considered as a point-to-point link.

Running a dynamic protocol, such as Open Shortest Path First (OSPF), Routing Information Protocol (RIP), or Border Gateway Protocol (BGP) on a tunnel interface would mean that routing information like adjacency, distance vector, and link state of the nodes behind one tunnel end point are shipped to the remote tunnel endpoint. As such, the routes at one end (local and private) are learned by the remote tunnel endpoint.

For example, FIG. 1 shows a tunnel link between endpoints A and B via the Internet. After enabling a dynamic protocol on the tunnel link interfaces on A and B, the routes to hosts in protected network A shall be visible to B as well as to hosts in protected network B. Similarly, the routes in protected network B shall be visible to A as well as to hosts in protected network A. The routing information conveyed in the dynamic routing protocol shall go out encrypted from A to B and B to A.

After the new routes are learned, for traffic from A or hosts in protected network A destined to B, or for hosts in protected network B, the tunnel interface can be chosen. As such, packets will go through IPsec processing, thereby coming out of the tunnel encrypted for destinations in B. Difficulties may arise, however, such as difficulties related to conflicts in routing between the virtual nature of the link between A and B and the physical links on which it is overlaid. Other difficulties may also arise, such as related to routing decisions between virtual paths and physical paths, between more than one virtual path, or between IPsec processing and routing procedures.

SUMMARY OF THE INVENTION

The present invention overcomes many routing difficulties that may arise in relation to dynamic routing and virtual paths. As such, the present invention provides methods for updating a routing table and routing packets on a network having virtual links overlaying physical links. One embodiment of the invention includes updating a routing table using interface information shared by a neighboring router. Other embodiments include making routing decisions based on interface information from a neighboring router. Further embodiments include making routing decisions based on priorities established according to interface information. Yet other embodiments include making routing decisions based on local interface information.

In one embodiment of the invention, a method of updating a routing table on a first gateway includes the steps of receiving data disclosing interface information on a neighboring second gateway, and updating a routing table based on the interface information. The interface information for the neighboring second gateway includes identification of communication interfaces on the second gateway, a neighbor for each one of the interfaces, an interface type for each one of the interfaces, and a physical type interface on which each virtual type interface is overlaid.

In another embodiment of the invention, a gateway is provided that routes packets based on data provided in an interface message from neighboring gateways. The steps involved in routing a packet at the gateway includes receiving the data packet, choosing a first route based on a routing protocol, determining an interface on the second gateway corresponding to a second next hop in the route, identifying a third gateway based on the interface, and if the third gateway matches the first gateway, choosing another route.

In other embodiments of the invention, computer-executable instructions for implementing the disclosed methods are stored on computer-readable media. Other features and advantages of the invention will become apparent with reference to the following detailed description and figures.

BRIEF DESCRIPTION OF THE DRAWINGS

The invention will be described in detail in the following description of preferred embodiments with reference to the following figures wherein.

DETAILED DESCRIPTION OF THE INVENTION

Figure 1:
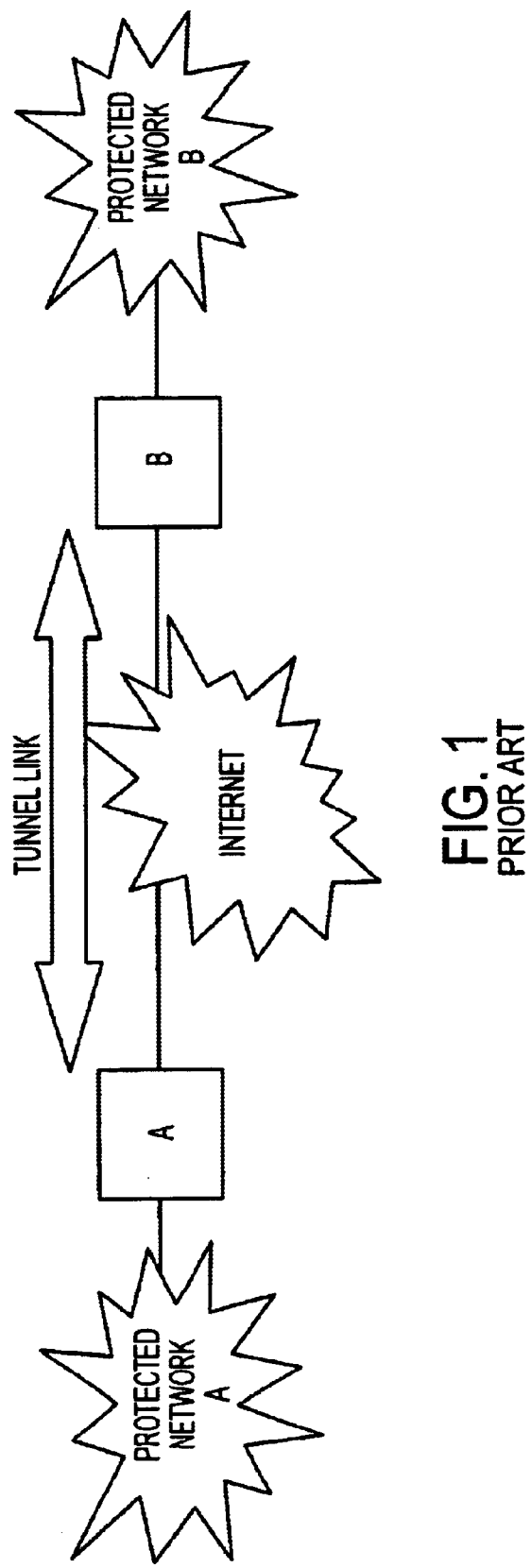
FIG. 1 shows an architecture that supports virtual connections between gateways in accordance with prior art.
Figure 2:
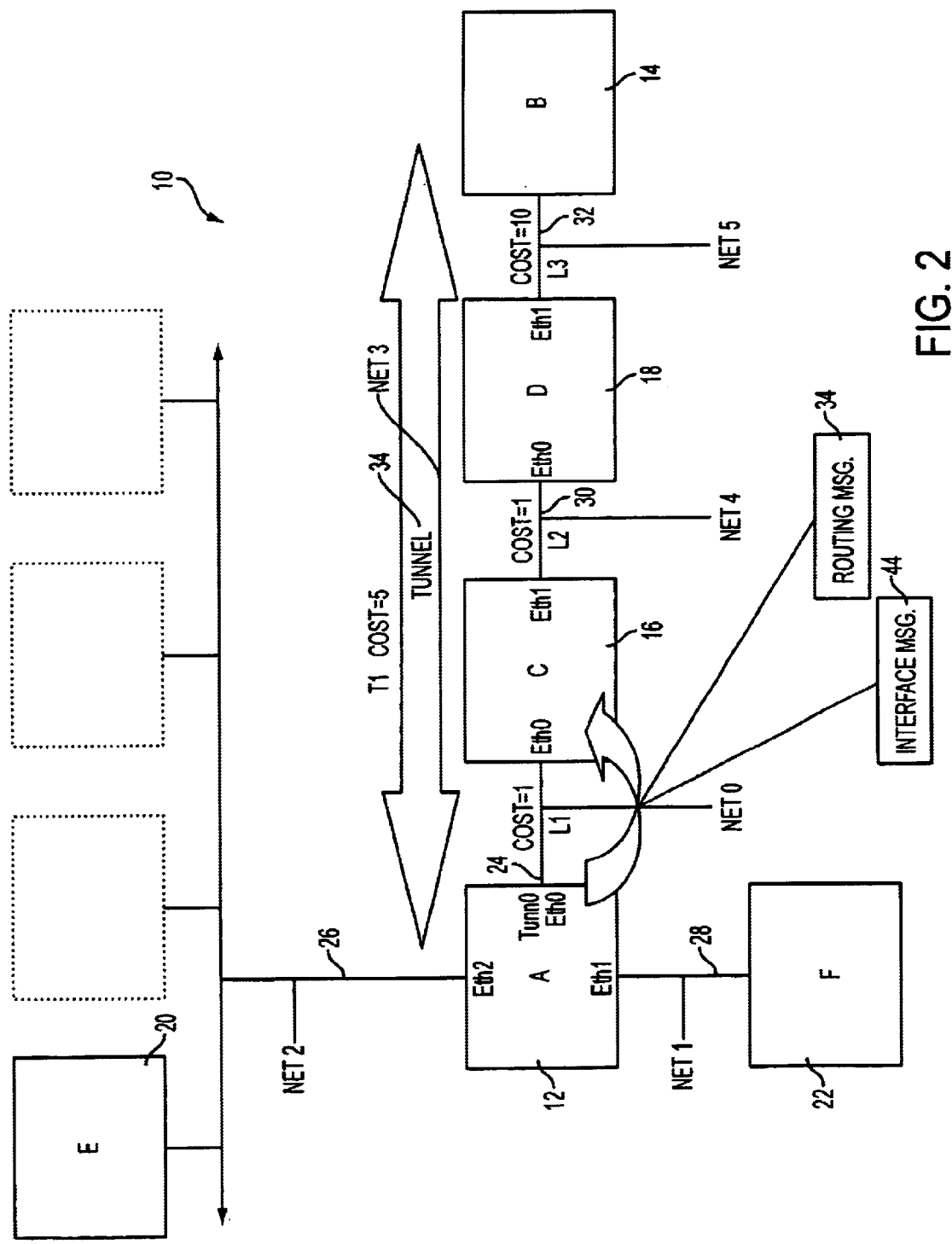
FIG. 2 shows an architecture that supports apparatus and methods in accordance with embodiments of the invention.

The invention may be embodied in various forms. Referring now to FIG. 2, a network architecture 10 is shown that supports systems and methods in accordance with embodiments of the invention. The architecture generally includes gateways A, B, C, D, E, and F labeled 12, 14, 16, 18, 20, and 22 respectively. A gateway as used herein refers to any device capable of forwarding data packets, such as a personal computer or a router. That is, the term gateway refers to any node in a network that can forward data packets, and can also refer to an entire network through which data packets are forwarded. Architecture 10 is a simple example that does not differentiate between hosts and routers, packet switches and terminals, subnets and links, etc. Each gateway is identified by its address, which is simply represented here as A, B, C, D, E and F. Assume for simplicity sake that the links are symmetric.

As shown, gateway A is connected to neighbors C, E, and F via links 24 (L1), 26 and 28 respectively. Likewise, gateway D is connected to neighbors C and B via links 30 (L2) and 32 (L3) respectively. The links may be point-to-point links or broadcast links. A tunnel 34 acts as a virtual link between gateways A and B, which have a security association therebetween. As such, gateways A and B treat each other as neighbors, even though in reality tunnel 34 is overlaid on physical links L1, L2 and L3. From the perspective of gateway A, gateway E is in the network net2, gateway B is the network net5, gateway C is in the network net0, gateway D is in the network net4, and gateway F is in the network net1.

Figure 5:
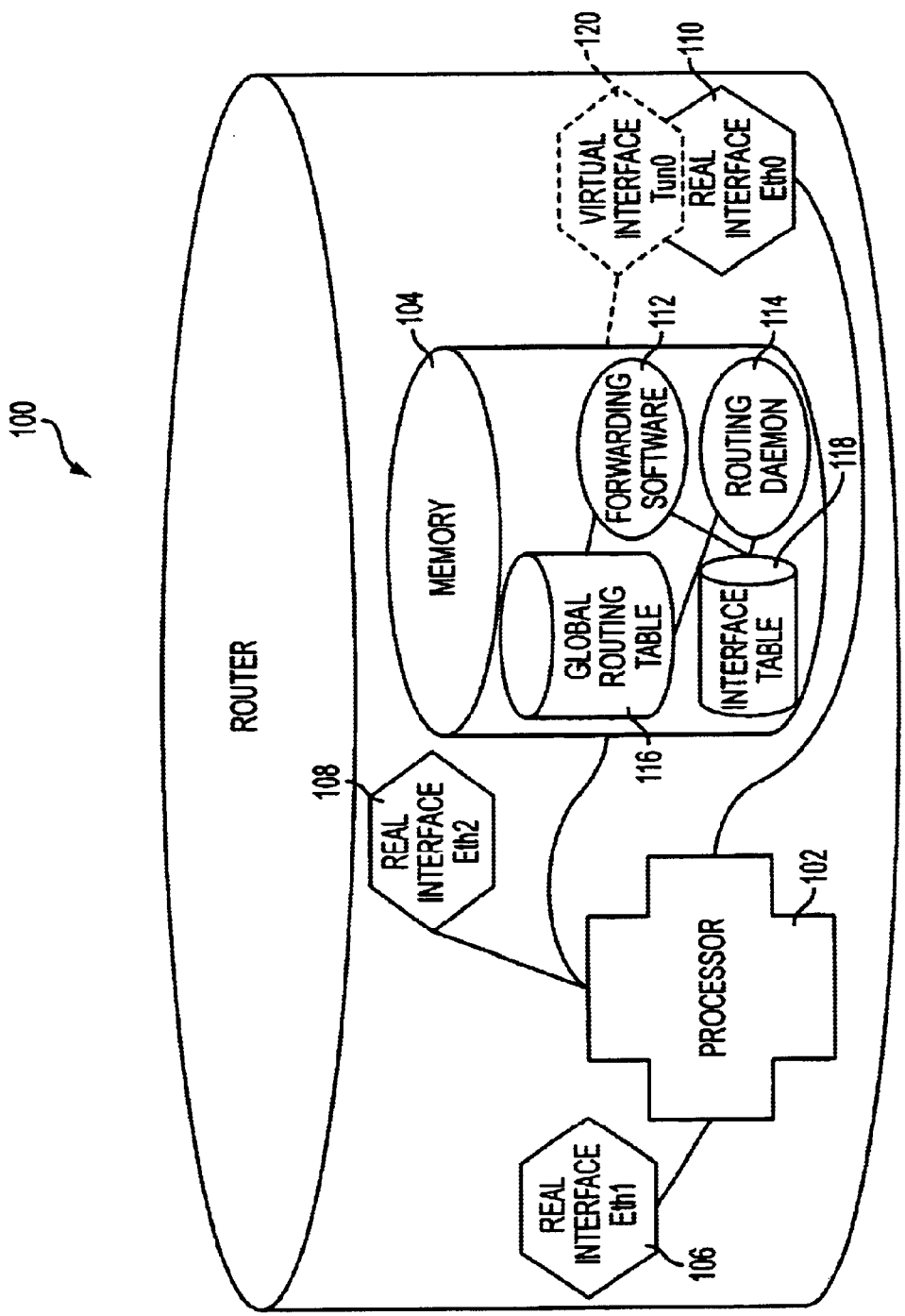
FIG. 5 shows a router according to a further embodiment of the present invention.

An example gateway according to one embodiment of the invention is shown in FIG. 5, which includes a router 100. The router 100 generally includes a processor 102 connected to a memory 104 and a plurality of real interfaces 106, 108, and 110. The real interfaces 106, 108, 110 according to one embodiment include ethernet interfaces identified as eth0, eth1 and eth2, which correspond to real (physical) interfaces 110, 106 and 108 respectively. As an example, suppose that router 100 represents gateway A. Accordingly, as represented in FIG. 2, interface eth0 is connected to network net0 with gateway C as a next hop within that network. In addition, eth1 is connected to network net1 with gateway F as a next hop within that network, and eth2 is connected to network net2 with gateway E as a next hop within that network. Further, based on a security association with another gateway, virtual interface 120 (e.g. tun0 for gateway C) may be established and stored in memory 104 for forwarding packets via an associated tunnel, such as tunnel 34. Tun0 therefore is a virtual interface on gateway A that is connected to network net3 with gateway B as a neighbor (a virtual next hop) within that network. Tun0, however, is overlaid on eth0, which is connected to net0 with gateway C as a neighbor.

Stored in the memory 104 of router 100 are forwarding software 112 and a global routing table 116. As discussed later, a routing daemon 114 may also be stored in the memory 104, as well as an interface table 118 for a neighboring router. Routing daemon 114 and forwarding software 112 are programs written in a language such as the language known as C. In one embodiment router 100 operates on a UNIX® operating system, such as systems known as Berkeley System Distribution Unix (BSD) or Free BSD.

Referring back to FIG. 2, suppose that from the perspectives of A and C, based on a metric such as a throughput metric or a delay metric, that tunnel 34 has a cost equal to 5. Suppose also that L1 has a cost of 1, L2 has a cost of 1, and L3 has a cost of 10. This creates an inconsistency of costs for tunnel 34 versus the aggregate cost of physical links L1, L2 and L3 on which tunnel 34 is overlaid. This inconsistency may be due to various reasons, such as the use of multiple metrics, inconsistent updates from gateways, flaws in computing metrics, or for other reasons.

Suppose now that a data packet (not shown) arrives at gateway A and that the data packet has a destination, for example a gateway (not shown) beyond gateway B. As such, gateway A may route the packet to gateway B through at least two routes. Assume that one route through tunnel 34 is a viable option and that another route through links L1, L2 and L3 (i.e. unencrypted) is another option. Assume based on the lower cost of tunnel 34, gateway A selects the route with tunnel 34 and therefore performs IPSec processing and forwards the packet on tunnel 34 to gateway B. Because tunnel 34 overlays L1, the packet is forwarded to C with a destination address for B. Based on an aggregate cost of 6 to forward the packet via L1 and tunnel 34 versus an aggregate cost of 11 to forward the packet via L2 and L3, gateway C forwards the packet to A. Gateway A repeats its evaluation and forwards the packet back to gateway C. Accordingly, the packet is continuously looped until its time to live expires, thereby never reaching gateway B. The continuous loop between A and C may be avoided by exchanging interface information between neighboring gateways A and C and updating their routing tables accordingly.

Referring now to FIGS. 2, 3, 5 and 10, a method for updating a routing table according to interface information for a neighbor gateway in accordance with one embodiment of the invention is shown. Inclusion of interface information of neighboring gateways in routing decisions avoids the loop problem discussed above. It further avoids other potential problems and provides advantages, such as greater flexibility and improved accuracy in routing decisions. Such routing decisions generally include the use of dynamic routing protocols.

As an example, suppose that a dynamic routing protocol in operation on gateway A and C includes a distance vector protocol such as Routing Information Protocol (RIP) version 1 (see IETF RFC 1058) or RIP version 2 (see IETF RFC 1388). In accordance with such protocols, gateways typically send routing messages to their neighbors that include routing information known by the sending gateway. Suppose that gateways A and C use RIP and that gateway A sends 80 to gateway C a routing message 34, which in this example is a RIP response message.

Figure 3:
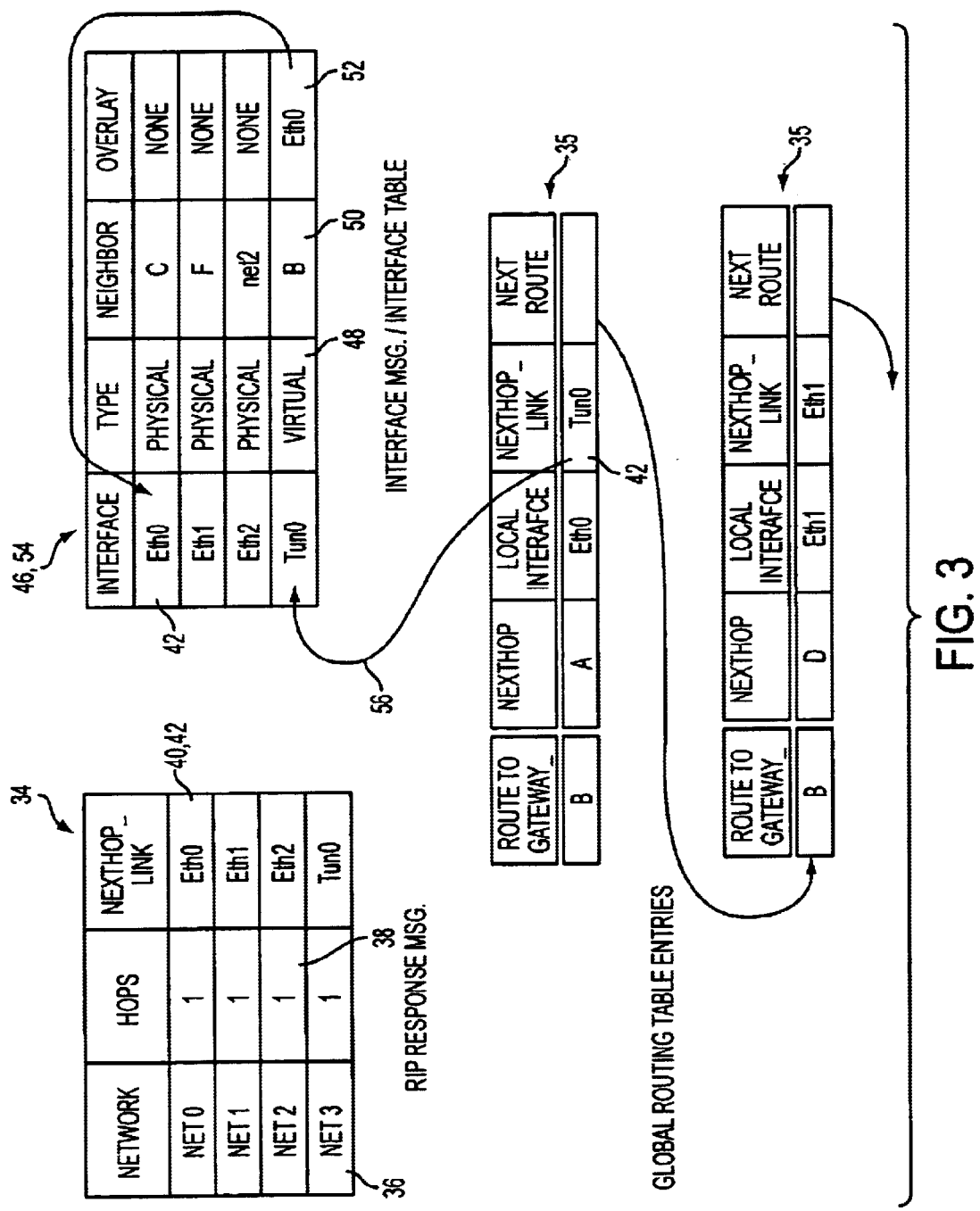
FIG. 3 shows a RIP Response Message and an Interface Message/Interface Table in accordance with one embodiment of the present invention according to the architecture of FIG. 2.
Figure 4:
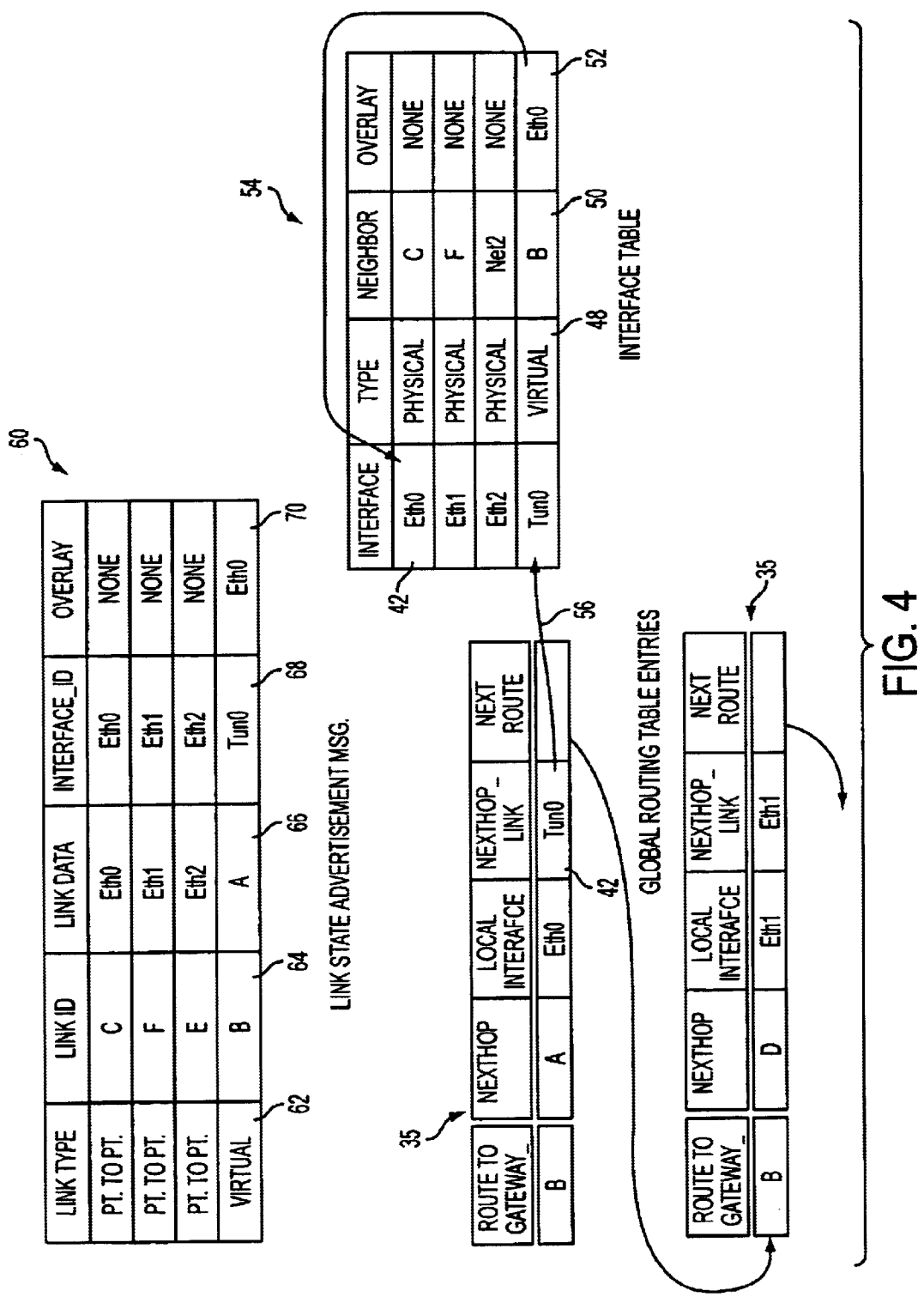
FIG. 4 shows a Link State Advertisement Message, an Interface Table, and entries from a Global Routing Table in accordance with another embodiment of the present invention according to the architecture of FIG. 2.

As shown in FIG. 3, the RIP response message 34 according to one embodiment of the invention includes an identification 36 of each network connected to A (e.g. net0, net1, net2 and net3), the number of hops 38 to each network identified, and a nexthop_link indicator 40 for each network. The nexthop_link indicator 40 in one embodiment includes information that discloses an interface_id 42 for one of the interfaces 106, 108, 110, 120 on A for the network represented by identification 36. In other words, nexthop_link discloses the interface on A that a packet will take in being forwarded on A to the network with which the nexthop_link is associated.

According to such an embodiment, gateway A also sends 82 an interface message 44 to gateway C. The interface message 44 may be sent along with the RIP response message 34 or it may be sent independently. The interface message 44 according to one embodiment includes an interface list 46 that discloses an interface_id 42 for each interface on gateway A. For each interface_id 42, interface message 44 discloses an interface type 48 for the corresponding interface on A, a neighbor 50 (a gateway for a point to point network or a network for a broadcast network) to which the corresponding interface is connected, and if the interface type 48 is virtual, the physical type interface 52 on which the virtual type interface is overlaid.

Figure 6:
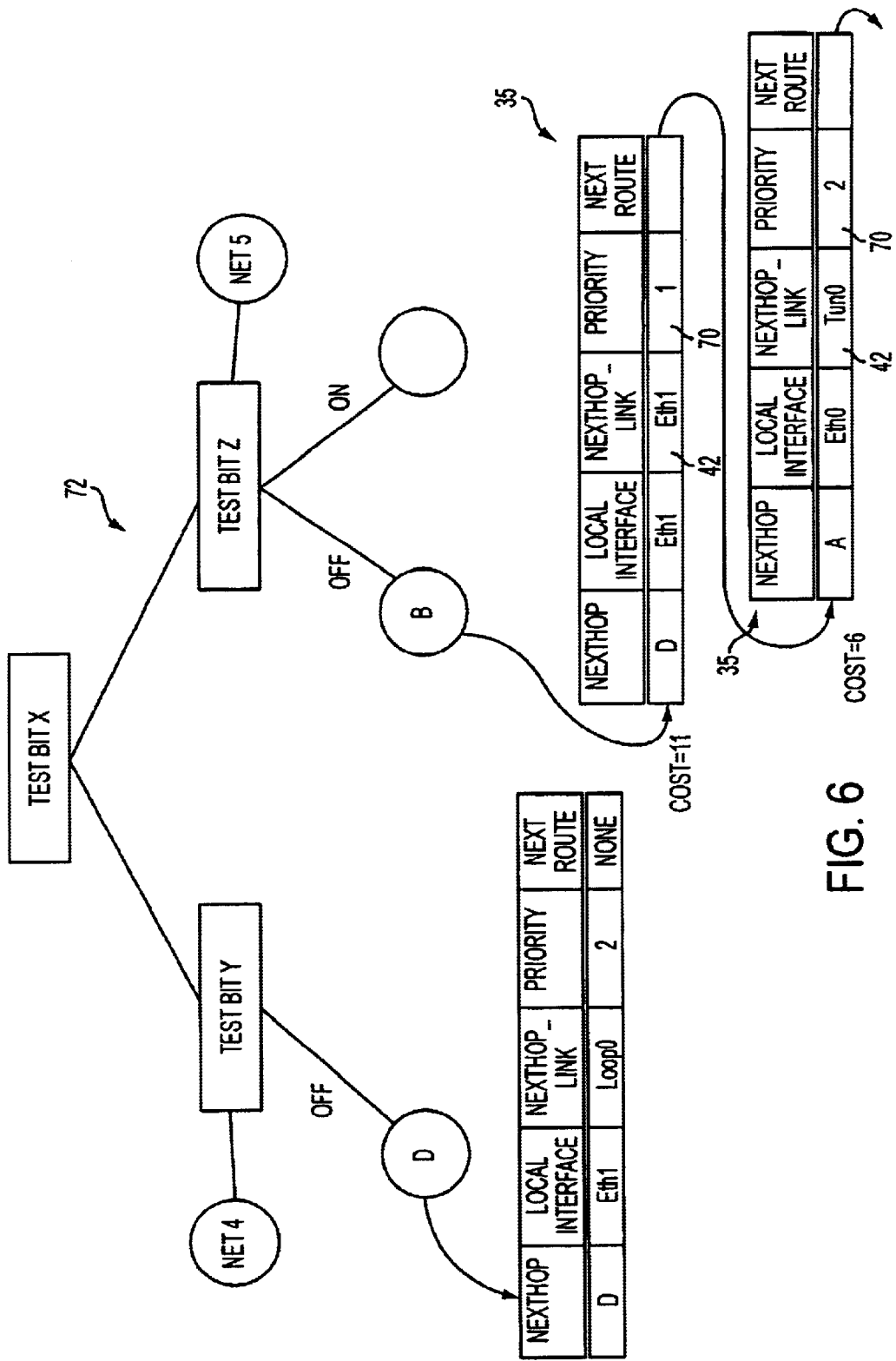
FIG. 6 shows a Radix Prefix Tree based on a Global Routing Table according to another embodiment of the present invention based on the architecture of FIG. 2.

Upon reception of the interface message 44, gateway C either creates 84 an interface table 54 for gateway A and stores it in memory 104, or updates an existing interface table 54 in memory 104, according to instructions stored in memory 104. The interface table 54 according to one embodiment includes interface list 46 from interface message 44. Upon reception of RIP Response message 34, gateway C updates 86 entries 35 of a global routing table (not shown) to include the nexthop_link indicator 42 for each associated route that includes gateway A as the nexthop in the route. The nexthop_link indicator 42 identifies the interface_id for the nexthop from gateway A in the associated route. The nexthop_link indicator 42 further includes a pointer 56 pointing to an entry in interface table 54 corresponding to the interface_id for the next hop. An example of global routing table entries that include nexthop_link indicators is shown in FIG. 6 and is discussed along with another embodiment of the invention.

Referring now to FIGS. 2, 4, 5 and 10, another embodiment of a method for updating a routing table according to the present invention is shown. This embodiment coincides with the use of a link state protocol, such as Open Shortest Path First (OSPF), on gateways A and C. As such, this embodiment is generally the same as the previous RIP embodiment, except that only a link state advertisement message 60 is sent 80 from A to C, rather than an interface message 44. A conventional OSPF link state advertisement message includes an indication of link type 62 for each link connected to the gateway, as well as a link_id 64 for a neighbor gateway connected to that link. It also typically includes link data 66 identifying real interfaces on the gateway for each real link. It may include an interface_id 68 for each interface on the gateway, but generally does not provide overlay information 70. In such an embodiment according to the present invention, the link state advertisement message 60 is expanded to include overlay information 70 for at least virtual link types.

As an example, link state advertisement message 60 includes link type information 62 for each interface on gateway A. The link_id 64 discloses each of A's neighbors based on the link. For example, the virtual link from A to B is represented accurately as a virtual type link with the link_id equaling "B," the neighbor through that link. It further includes link_data 66, which identifies a physical interface for each link, or for each virtual link, identifies a gateway (e.g. gateway A) as a host of the virtual link. It may further include interface_id 68, which identifies an interface for each physical or virtual link. Accordingly, the interface_id for the virtual link on gateway A identifies tun0 as the interface for the virtual link to B. Overlay information 70 identifies physical interface "eth0" as being the real interface for the virtual link 34 to gateway B.

Upon reception 80 of the link state advertisement message 60, in accordance with a further embodiment the present invention, an interface table 54 is created (or updated) 84 based on the information in the advertisement message 60. Further, entries 35 in the global routing table (not shown) for gateway C may also be updated 86 to include a nexthop_link indicator 42. The nexthop_link indicator 42 may be created by information inferred from the advertisement message 60. For example, routing daemon 114 may evaluate advertisement message 60 and determine that the nexthop_link for the virtual link on gateway A is "tunO." Routing daemon 114 may further create a pointer to an entry in the interface table 54 that corresponds to the nexthop_link for the virtual link. Based on the updated global routing table (not shown) and the interface table 54, methods for routing packets disclosed in accordance with the RIP embodiment are also applicable in this embodiment.

Figure 10:
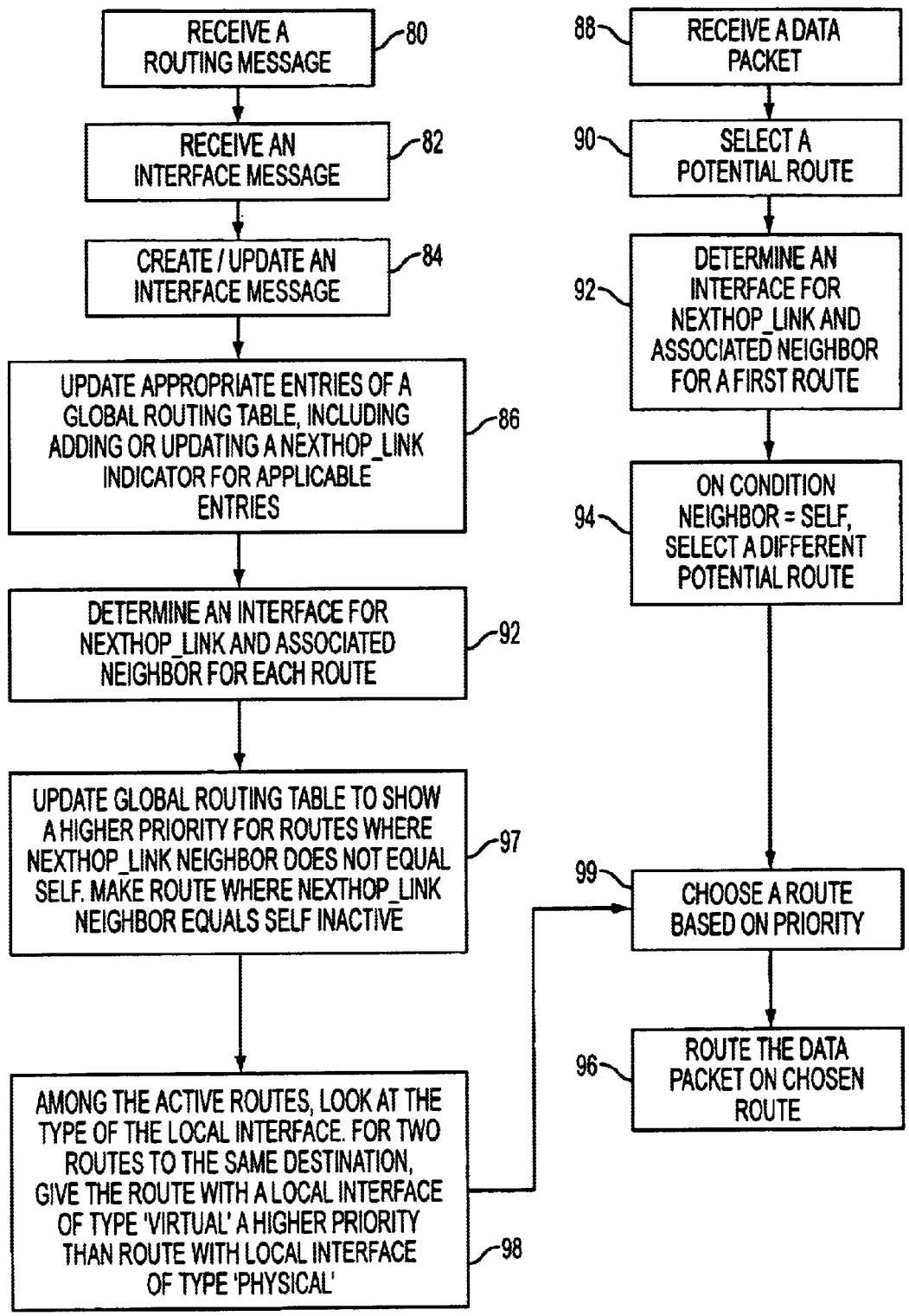
FIG. 10 shows steps of a method in accordance with embodiments of the invention.

In a further embodiment of the present invention shown in FIGS. 2, 5 and 10, a method of routing a data packet includes the steps of receiving 88 a data packet (not shown) and choosing 90 a potential route based on a routing protocol. Suppose that the routing is a part of forwarding software 122 stored on gateway C. Suppose further that gateway C receives a packet (not shown) destined for gateway B and that the routing protocol selects the route of L1 to A and A to B (network 3) via tunnel 34 as the potential route. After selecting such a route, forwarding software 122 (or alternatively routing daemon 114) reviews the entry 35 for the selected route in the global routing table (not shown), which includes a nexthop_link indicator 42. Upon finding the nexthop_link indicator 42, forwarding software 122 is able to determine 92 the interface that will be taken on gateway A to forward the packet to gateway B. As indicated by nexthop_link indicator 42, and as shown in the example architecture 10 and RIP response message 34, gateway A will forward the packet along such a route using interface tun0.

Because nexthop_link indicator 42 further includes a pointer 56 to an entry in interface table 54, forwarding software 112 is able to determine 92 that the interface having interface_id "tun0" is a virtual link to neighbor B that is overlaid on the outgoing physical interface represented by interface_id "eth0." Based on the entry in interface table 54 for interface_id "eth0," forwarding software 112 is able to determine that the packet will be forwarded on "eth0" to neighbor "C." Once forwarding software 112 recognizes itself (gateway C) as the neighbor for the nexthop_link on A, it will choose 94 another route that excludes gateway A. As such, the forwarding software 122 will return another route to B as a potential route, such as a route through D. A route is chosen 99 based on priority, and the forwarding software forwards 96 the data packet along the selected route.

Referring now to FIGS. 2, 5, 6 and 10, another embodiment of the present invention is shown, which includes a further method for forwarding a data packet (not shown) based on interface information. This method may take advantage of previous methods discussed for updating a routing table. However, in accordance with this method, a routing daemon 114 stored in memory 104 of a router 100 updates 97 route entries 35 of global routing table (not shown) to include priorities 70 based on interface information. For example, assume gateway C has established an interface table 54 for gateway A and has updated routing entries 35 associated with routes to gateway B to include nexthop_link indicators 42. Based on instructions included in daemon 114, daemon 114 evaluates the nexthop_link 42 for each route to B (e.g. via D or via A), and assigns a priority based on a potential conflict with the route via A. Daemon 114 determines the potential conflict by following the pointer 56 of nexthop_link indicator 42 and by determining that packets via tun0 on gateway A will be routed to itself, gateway C.

As part of the method for routing the packet (not shown), forwarding software 112 consults global routing table entries 35 for routes to B. This may occur by following logic such as represented by, for example, a Radix Prefix Tree 72. Upon evaluating the priorities of entries 35, forwarding software 112 selects 99 the route via D based on its assigned priority being higher than the priority for the route via A. As such, even though the route via A has a lower cost as determined by metrics, the route via D is selected and the data packet is forwarded 96 along that route.

Figure 7:
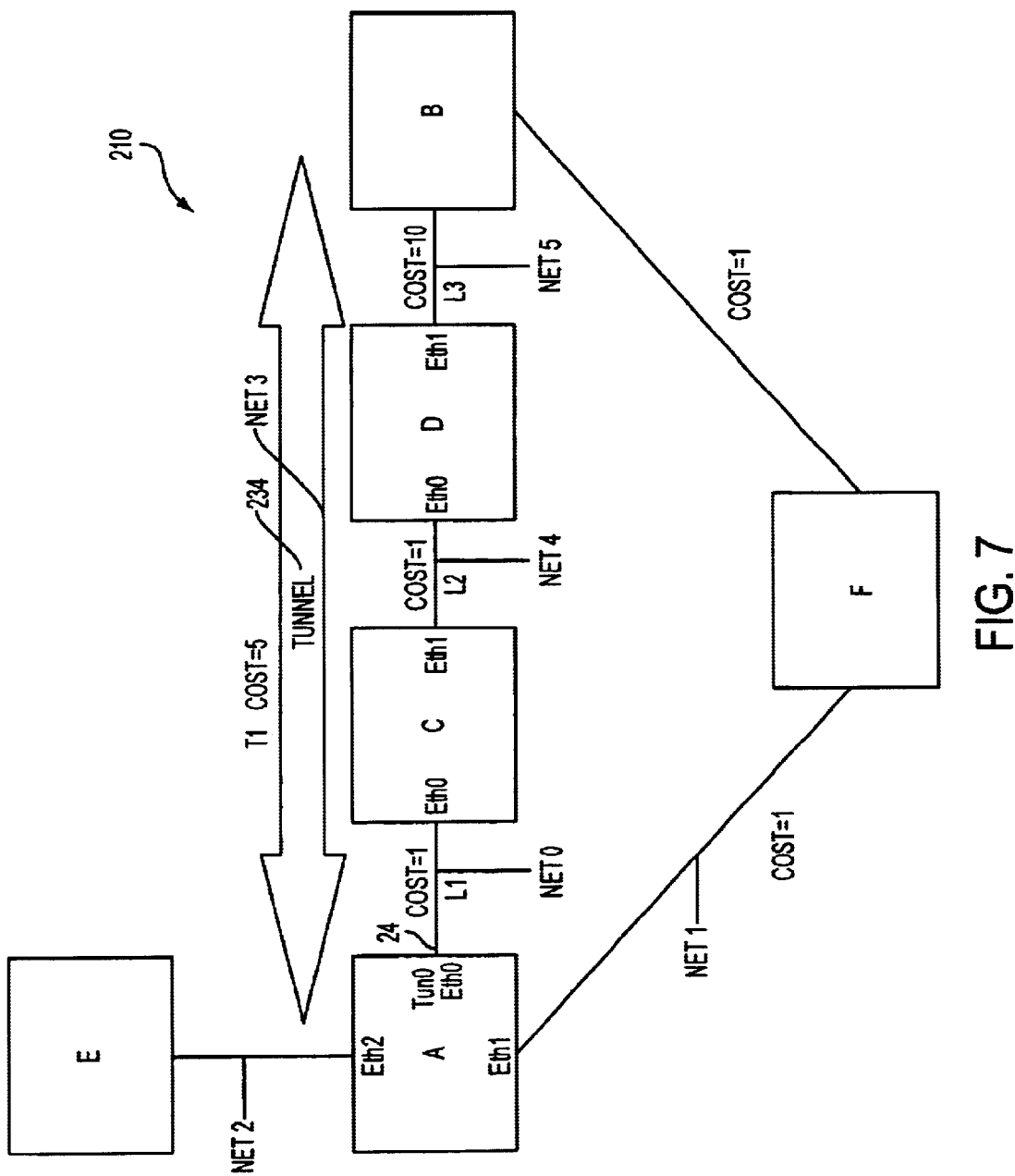
FIG. 7 shows another architecture that supports apparatus and methods in accordance with embodiments of the invention.

Referring now to FIG. 7, a network architecture 210 is shown that supports systems and methods in accordance with further embodiments of the invention. The architecture 210 generally includes gateways A, B, C, D, E, and F labeled 212, 214, 216, 218, 220, and 222 respectively. Architecture 210 is similar to architecture 10 of FIG. 2, except that gateway F is shown connected to gateway B. Further, the cost for routing a packet (not shown) between A and B via gateway F as determined by metrics is 2, versus a cost of 5 via tunnel 234. Accordingly, for a packet received at gateway A for forwarding to gateway B, a routing decision based on metrics would favor the route via gateway F. Such a decision, however, may be contrary to the intent of sending the packet (not shown) to gateway A. For example, it may be desirable for the packet to be routed to gateway B in an encrypted state via tunnel 234, rather than in an unencrypted state via gateway F. A routing decision based on metrics, therefore, would frustrate this intent.

Figure 8:
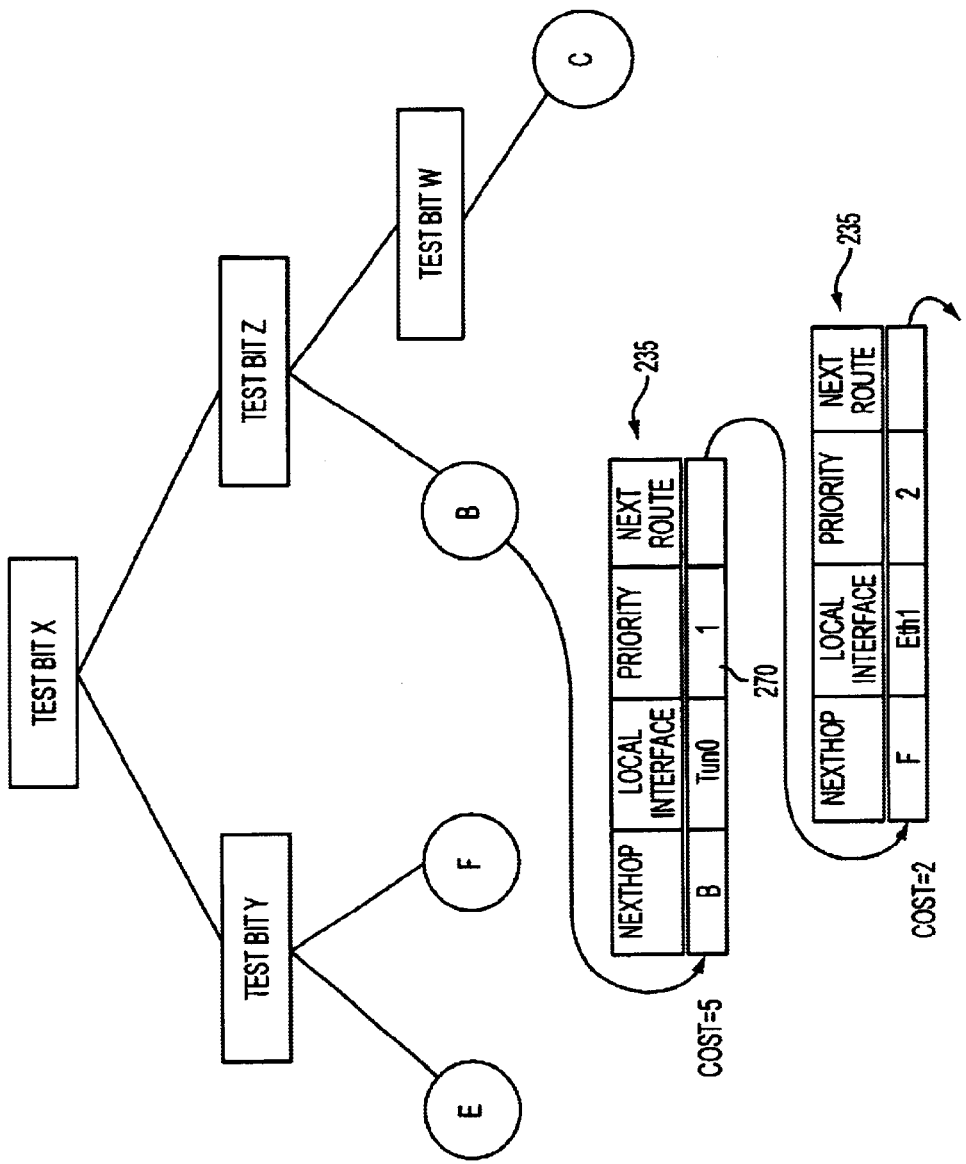
FIG. 8 shows a Radix Prefix Tree based on a Global Routing Table according to another embodiment of the present invention based on the architecture of FIG. 7.

A method of routing a data packet according to one embodiment of the invention is illustrated with reference to FIGS. 7, 8 and 10. Suppose that a data packet (not shown) is received at gateway A that has a destination of gateway B. According to instructions stored in the memory 104 of gateway A, such as part of a routing daemon 114, entries 235 corresponding to routes to gateway B in a routing table (not shown) are evaluated and updated 98 to include priorities 270. The priorities are determined by routing daemon 114 based on the interface type for a local interface corresponding to each route. As such, routing daemon 114 considers the local interface associated with each route and determines the interface type for each interface. Daemon 114 thereby determines that the route to gateway B via gateway F is connected to local interface eth1, which is a physical type interface. Daemon 114 also determines that the route via tunnel 234 is connected to local interface tun0 and is a virtual type interface. Because tun0 is a virtual interface and eth1 is a physical interface, daemon 114 assigns a higher priority 270 to the route via tunnel 234.

Based on the priorities, forwarding software 112 selects the route via tunnel 234 even though the route via gateway F has a lower cost. Accordingly, the packets received at gateway A will be encrypted in transmission to gateway B via tunnel 234, despite other choices suggested by metrics.

In another embodiment of the invention, forwarding software 112 performs the steps performed by routing daemon 114 except for assigning priorities. As such, forwarding software 112 determines that the route via tunnel 234 is connected to local interface tun0 and is a virtual type interface. Because tun0 is a virtual interface and eth1 is a physical interface, forwarding software 112 selects the route via tunnel 234 according to its programming despite the costs determined by metrics.

Figure 9:
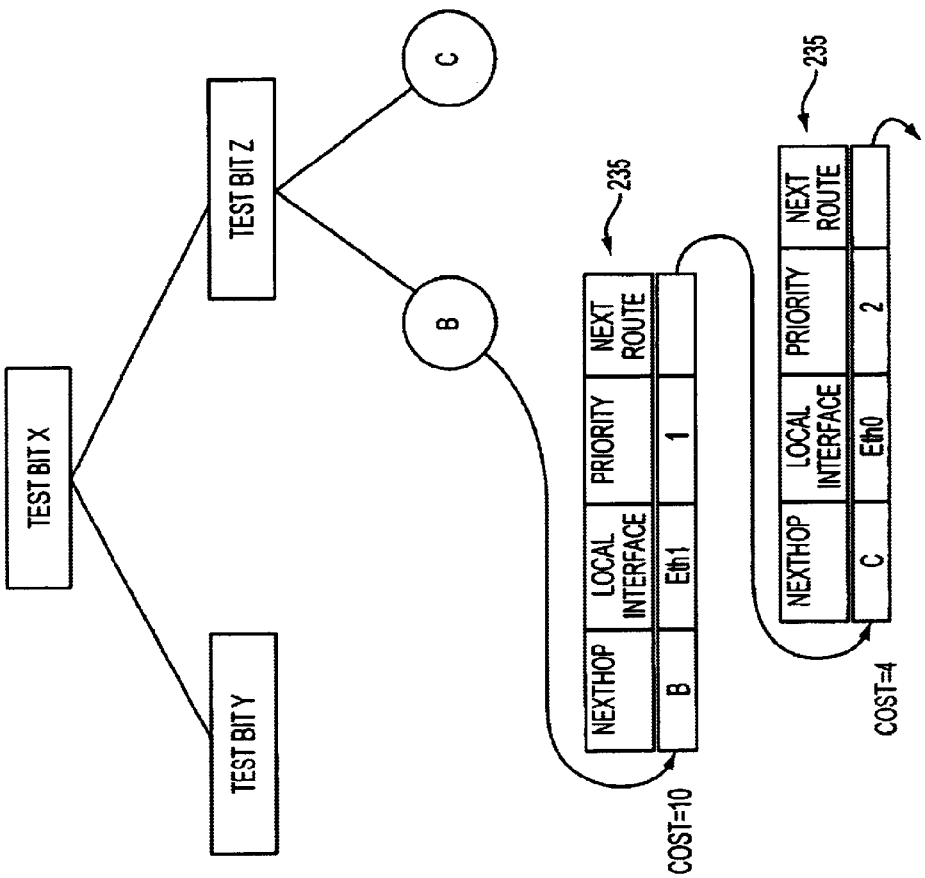
FIG. 9 shows a Radix Prefix Tree based on a Global Routing Table according to a further embodiment of the present invention based on the architecture of FIG. 7.

Referring now to FIGS. 7 and 9, a method of routing a data packet according to a further embodiment of the invention is shown. Suppose that an encrypted data packet (not shown) is received at gateway D from gateway C that has a destination address of gateway B, as part of routing on tunnel 234. Based on metrics, it is possible that gateway D will forward the data packet to gateway C on a route to gateway B that includes gateways C, A, and F. This may cause a loop as the packet is routed back and forth between gateways C and D or gateways A, C and D.

According to a further embodiment of the present invention, a method for routing a packet is shown in FIG. 9. As such, instructions stored in the memory 104 of gateway D, such as daemon 114, evaluates potential routes for forwarding the packet to gateway B by looking at entries 235 of a global routing table. Upon recognizing that the direct route to gateway B includes one hop (e.g. nexthop=B), daemon 114 assigns a higher priority to this route than to other routes that includes multiple hops. Accordingly, forwarding software 112 selects the direct route to gateway B over other routes suggested by metrics.

While the present invention has been described in connection with the illustrated embodiments, it will be appreciated and understood that modifications may be made without departing from the true spirit and scope of the invention. In particular, the invention applies to almost any type of network and a variety of different routing protocols, such as path vector protocols.

I claim:

1. A method of updating a routing table on a first gateway, the method comprising the steps of:

receiving data disclosing interface information on a neighboring second gateway, the interface information comprising:

an interface_id for each one of communication interfaces located on the second gateway, the interface_id comprising an identification of the corresponding communication interface; and identification of a neighbor connected to each one of the interfaces; and updating the routing table to include at least some of the interface information.

2. A method of updating a routing table on a first gateway, the method comprising the steps of:

receiving data disclosing interface information on a neighboring second gateway, the interface information comprising:

an interface id for each one of communication interfaces located on the second gateway, the interface id comprising an identification of the corresponding communication interface; and identification of a neighbor connected to each one of the interfaces; and updating the routing table to include at least some of the interface information;

wherein the interface information further comprises:

an interface type for each one of the communication interfaces, the interface type comprising one of a virtual type and a physical type.

3. The method of claim 2, wherein the interface information further comprises:

overlay information for a virtual type interface of the communication interfaces, the overlay information identifying a physical type interface of the communication interfaces on which the virtual type interface is overlaid.

4. The method of claim 2, wherein the first gateway uses a distance-vector routing protocol and the step of receiving data comprises the steps of:

receiving a routing message from the second gateway, the routing message comprising distance vector information for transmitting messages between the second gateway and destination gateways connected to the second gateway, the routing message further comprising a nexthop_link indicator for each destination gateway, the nexthop_link indicator comprising information disclosing the interface_id for one of the interfaces on the second gateway that corresponds to a nexthop from the second gateway toward a destination gateway associated with the nexthop_link indicator; and receiving an interface message from the second gateway.

5. The method of claim 4, wherein the interface message comprises an interface list disclosing:

the interface type corresponding to each one of the communication interfaces, a neighbor connected to each one of the communication interfaces, and for each virtual type interface, overlay information identifying a physical type interface of the communication interfaces on which the virtual type interface is overlaid.

6. The method of claim 4 wherein the distance-vector protocol comprises a protocol known as Routing Information Protocol (RIP) and the routing message comprises a Response Message.

7. The method of claim 4, wherein each one of the nexthop_link indicators points to a corresponding entry in the interface message.

8. The method of claim 4, wherein the step of updating the routing table comprises inserting the nexthop_link indicator in the routing table.

9. The method of claim 2, wherein the routing table comprises a global routing table and the method further comprises the step of updating routing priorities on the global routing table for the first gateway based on the interface information.

10. A method of updating a routing table on a first gateway, the method comprising the steps of:

receiving data disclosing interface information on a neighboring second gateway, the interface information comprising:

an interface id for each one of communication interfaces located on the second gateway, the interface id comprising an identification of the corresponding communication interface; and identification of a neighbor connected to each one of the interfaces; and updating the routing table to include at least some of the interface information;

wherein the gateway uses a link state routing protocol and the step of receiving data comprises the step of receiving a routing message from the second gateway, the routing message comprising link state information and overlay information, the overlay information identifying a physical type interface of the communication interfaces on which a virtual type interface of the communication interfaces is overlaid.

11. The method of claim 10, wherein the routing message further comprises an interface_id for each one of the communication interfaces, the interface_id identifying one of the communication interfaces on the second gateway.

12. The method of claim 10, wherein the link state routing protocol comprises a protocol known as Open Shortest Path First (OSPF) and the routing message comprises a link state advertisement.

13. The method of claim 10, further comprising the step of inserting a nexthop_link indicator for each route in the routing table, the nexthop_link indicator comprising information disclosing the interface_id for one of the interfaces on the second gateway that corresponds to a neighbor gateway associated with the corresponding route.

14. A method of updating a routing table on a first gateway, the method comprising the steps of:

receiving data disclosing interface information on a neighboring second gateway, the interface information comprising:

an interface id for each one of communication interfaces located on the second gateway, the interface id comprising an identification of the corresponding communication interface; and identification of a neighbor connected to each one of the interfaces;

updating the routing table to include at least some of the interface information; and updating an interface table, the interface table comprising information disclosing:

the interface_id for each one of communication interfaces located on the second gateway;

the interface type for each interface_id, the interface type comprising one of a virtual type and a physical type;

a neighbor connected to each one of the interfaces; and a physical type interface on which each virtual type interface is overlaid.

15. The method of claim 14, wherein the first gateway uses a distance vector routing protocol and the interface table is updated based on an interface message received from the second gateway.

16. The method of claim 14, wherein the first gateway uses a link state routing protocol and the interface table is updated based on information provided in a link state advertisement, the link state advertisement comprising information identifying the interfaces on the second gateway, a type of each one of the interfaces on the second gateway, a neighbor gateway connected to each one of the interfaces, and overlay information disclosing a physical interface of the communication interfaces on which a virtual interface of the communication interfaces is overlaid.

17. A method of routing a data packet at a first gateway, the method comprising the steps of:

receiving the data packet;

choosing a first route for routing the packet based on a routing protocol, the first route comprising a first next hop to a second gateway and a second next hop from the second gateway to a third gateway;

determining an interface on the second gateway corresponding to the second next hop;

identifying the third gateway based on the interface; and if the identity of the third gateway matches the first gateway, choosing a second potential route excluding the second gateway.

18. The method of claim 17, wherein the step of determining an interface comprises the step of consulting a routing table on the first gateway.

19. A method of routing a data packet at a first gateway, the method comprising the steps of:

receiving the data packet;

choosing a first route for routing the packet based on a routing protocol, the first route comprising a first next hop to a second gateway and a second next hop from the second gateway to a third gateway;

determining an interface on the second gateway corresponding to the second next hop;

identifying the third gateway based on the interface; and if the identity of the third gateway matches the first gateway, choosing a second potential route excluding the second gateway;

wherein the step of determining an interface comprises the step of consulting a routing table on the first gateway, the routing table comprises a nexthop_link indicator for the first route, the nexthop_link indicator comprising information identifying an interface on the second gateway that corresponds to the first route and a pointer pointing to an entry in an interface table for the second gateway corresponding to the interface.

20. The method of claim 19, wherein the routing protocol is selected from the group consisting of distance vector protocols and link state protocols.

21. The method of claim 19, wherein the entry in the interface table comprises:

an interface_id identifying the interface on the second gateway;

an interface type corresponding to the interface, the interface type comprising one of a virtual type and a physical type;

a neighbor connected to the interface; and if the interface type is a virtual type, overlay information identifying a physical type interface on which the virtual type interface is overlaid.

22. A method of routing a data packet at a gateway, the method comprising the steps of:

updating a routing table on a gateway, the routing table comprising a first route and a second route, the step of updating comprising the steps of:

determining a local interface for each one of the routes;

determining an interface type for each one of the local interfaces; and assigning a priority to each one of the routes based on the corresponding interface type; and choosing between the first route and the second route based on the corresponding priorities.

23. A method of routing a data packet at a gateway, the method comprising the steps of:

updating a routing table on a gateway, the routing table comprising a first route and a second route, the step of updating comprising the steps of:

determining a local interface for each one of the routes;

determining an interface type for each one of the local interfaces; and assigning a priority to each one of the routes based on the corresponding interface type; and choosing between the first route and the second route based on the corresponding priorities;

wherein the interface type for the first route interface comprises a virtual type and the interface type for the second route interface comprises a physical type, the method further comprising the steps of assigning a higher priority to the first route than to the second route, the step of choosing comprising the step of selecting the first route.

24. The method of claim 23, wherein a cost associated with said first route is higher than a cost associated with said second route.

25. A method of routing a data packet at a gateway, the method comprising the steps of:

updating a routing table on a gateway, the routing table comprising a first route and a second route, the first route having a higher cost determined by a metric than the second route, the first route comprising a single hop to the destination, the second route comprising more than one hop to the destination, the step of updating comprising the step of assigning a priority to each one of the routes based on the whether the route comprises one hop or more than one hop, the priority associated with the first route being higher than the second route; and choosing between the first route and the second route based on the corresponding priorities.

26. A first gateway adapted to forward data packets, the gateway comprising:

a first communications interface;

a memory; and a processor for performing steps according to instructions stored in the memory, the steps comprising:

receiving via the first communications interface data disclosing interface information on a neighboring second gateway, the interface information comprising:

an interface_id for each one of communication interfaces located on the second gateway, the interface_id comprising an identification of the corresponding second gateway interface; and identification of a neighbor connected to each one of the second gateway interfaces; and updating a routing table stored in the memory to include at least some of the interface information.

27. A first gateway adapted to forward data packets, the gateway comprising:

a first communications interface;

a memory; and a processor for performing steps according to instructions stored in the memory, the steps comprising:

receiving via the first communications interface data disclosing interface information on a neighboring second gateway, the interface information comprising:

an interface id for each one of communication interfaces located on the second gateway, the interface_id comprising an identification of the corresponding second gateway interface; and identification of a neighbor connected to each one of the second gateway interfaces; and updating a routing table stored in the memory to include at least some of the interface information;

wherein the interface information further comprises:

overlay information for a virtual type interface of the second gateway interfaces, the overlay information identifying a physical type interface of the second gateway interfaces on which the virtual type interface is overlaid.

28. The first gateway of claim 27, wherein the interface information further comprises:

an interface type for each one of the second gateway interfaces, the interface type comprising one of a virtual type and a physical type.

29. The first gateway of claim 27, wherein the first gateway uses a distance-vector routing protocol and the step of receiving data comprises the steps of:

receiving via the first communications interface a routing message from the second gateway, the routing message comprising distance vector information for transmitting messages between the second gateway and destination gateways connected to the second gateway, the routing message further comprising a nexthop_link indicator for each destination gateway, the nexthop_link indicator comprising information disclosing the interface_id for one of the interfaces on the second gateway that corresponds to a nexthop from the second gateway toward a destination gateway associated with the nexthop_link indicator; and receiving an interface message from the second gateway.

30. The first gateway of claim 29, wherein the interface message comprises an interface list disclosing:
   the interface type corresponding to each one of the second gateway interfaces,
   a neighbor connected to each one of the communication interfaces, and
   for each virtual type interface, overlay information identifying a physical type interface of the communication interfaces on which the virtual type interface is overlaid.

31. The first gateway of claim 29, wherein the step of updating the routing table comprises inserting the nexthop_link indicator in a routing table.

32. The first gateway of claim 27, wherein the first gateway uses a link state routing protocol and the step of receiving data comprises the step of receiving a routing message from the second gateway, the routing message comprising link state information and overlay information, the overlay information identifying a physical type interface of the communication interfaces on which each virtual type interface of the communication interfaces is overlaid.

33. The first gateway of claim 32, wherein the routing message further comprises an interface_id for each one of the second gateway interfaces, the interface_id identifying one of the second gateway interfaces.

34. The first gateway of claim 27, wherein the processor performs the further step comprising updating routing priorities on a global routing table for the first gateway based on the interface information.

35. A first gateway adapted to forward data packets, the gateway comprising:
   a communications interface;
   a memory; and
   a processor for performing steps according to instructions stored in the memory, the steps comprising:
      receiving a data packet via the communications interface;
      choosing a first route for routing the packet based on a routing protocol, the first route comprising a first next hop to a second gateway and a second next hop from the second gateway to a third gateway;
      determining an interface on the second gateway corresponding to the second next hop;
      identifying the third gateway based on the second gateway interface; and
      if the identity of the third gateway matches the first gateway, choosing a second potential route excluding the second gateway.

36. A gateway adapted to forward data packets, the gateway comprising:
   a plurality of communications interfaces;
   a memory; and
   a processor for performing steps according to instructions stored in the memory, the steps comprising:
      updating a routing table on the gateway, the routing table comprising a first route and a second route, the step of updating comprising the steps of:
         determining a local interface of the plurality of communication interfaces for each one of the routes;
         determining an interface type for each one of the local interfaces; and
         assigning a priority to each one of the routes based on the corresponding interface type;
      receiving a data packet via the communications interface;
      choosing between the first route and the second route for forwarding the data packet based on the corresponding priorities; and
      forwarding the data packet.

37. A gateway adapted to forward data packets, the gateway comprising:
   a plurality of communications interfaces;
   a memory; and
   a processor for performing steps according to instructions stored in the memory, the steps comprising:
      updating a routing table on the gateway, the routing table comprising a first route and a second route, the step of updating comprising the steps of:
         determining a local interface of the plurality of communication interfaces for each one of the routes;
         determining an interface type for each one of the local interfaces; and
         assigning a priority to each one of the routes based on the corresponding interface type;
      receiving a data packet via the communications interface;
      choosing between the first route and the second route for forwarding the data packet based on the corresponding priorities; and
   forwarding the data packet;
   wherein the interface type for the first route interface comprises a virtual type and the interface type for the second route interface comprises a physical type, the method further comprising the steps of assigning a higher priority to the first route than to the second route, and the step of choosing comprises the step of selecting the first route.

38. A computer readable medium for storing computer readable instructions for performing steps on a first gateway, the steps comprising:
   receiving data disclosing interface information on a neighboring second gateway, the interface information comprising:
      an interface_id for each one of communication interfaces located on the second gateway, the interface_id comprising an identification of the corresponding second gateway interface; and
      identification of a neighbor connected to each one of the second gateway interfaces; and
   updating a routing table stored to include at least some of the interface information.

39. A computer readable medium for storing computer readable instructions for performing steps on a first gateway, the steps comprising:
   receiving a data packet;
   choosing a first route for routing the packet based on a routing protocol, the first route comprising a first next hop to a second gateway and a second next hop from the second gateway to a third gateway;
   determining an interface on the second gateway corresponding to the second next hop;
   identifying the third gateway based on the second gateway interface; and
   if the identity of the third gateway matches the first gateway, choosing a second potential route excluding the second gateway.

* * * * *

UNITED STATES PATENT AND TRADEMARK OFFICE
CERTIFICATE OF CORRECTION

PATENT NO.   : 6,744,774 B2
DATED        : June 1, 2004
INVENTOR(S)  : Atul Sharman It is certified that error appears in the above-identified patent and that said Letters Patent is hereby corrected as shown below:

<u>Column 8,</u>
Lines 43 and 44, please replace "interface id" with -- interface _id --

<u>Column 9,</u>
Lines 42 and 43, please replace "interface id" with -- interface _id --

<u>Column 10,</u>
Lines 9 and 10, please replace "interface id" with -- interface _id --

<u>Column 12,</u>
Line 37, please replace "interface id" with -- interface _id --

Signed and Sealed this

Thirty-first Day of May, 2005

JON W. DUDAS
*Director of the United States Patent and Trademark Office*